Feb. 14, 1956
R. C. FRITZSCH
2,734,609
PNEUMATIC CLUTCH CONTROL
Filed April 9, 1953
7 Sheets-Sheet 1
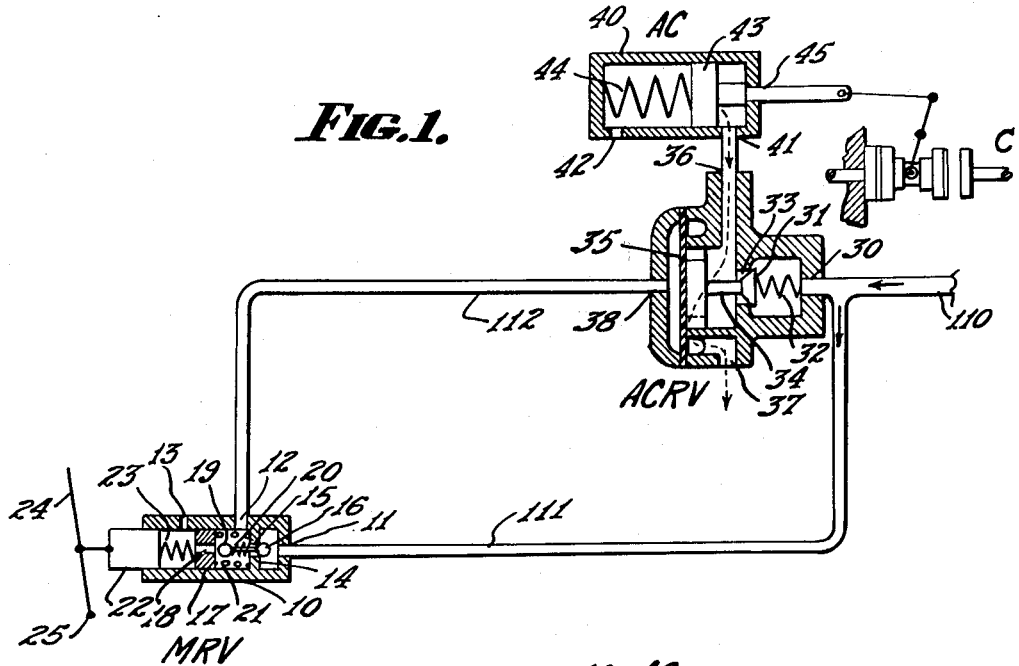
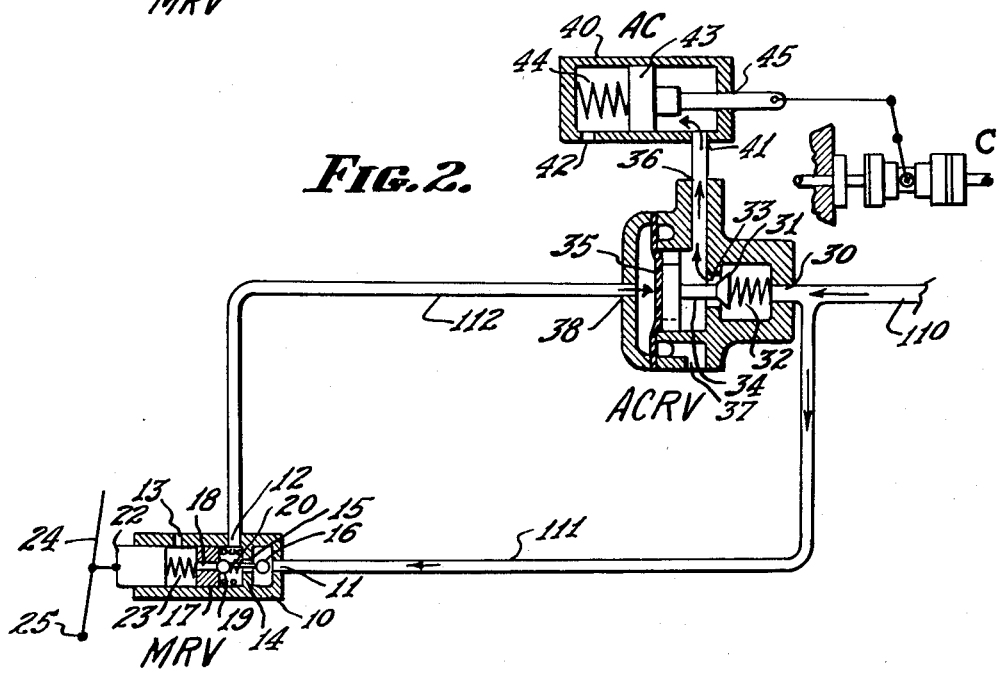
INVENTOR.
RALPH C. FRITZSCH,
BY
ATTORNEYS.

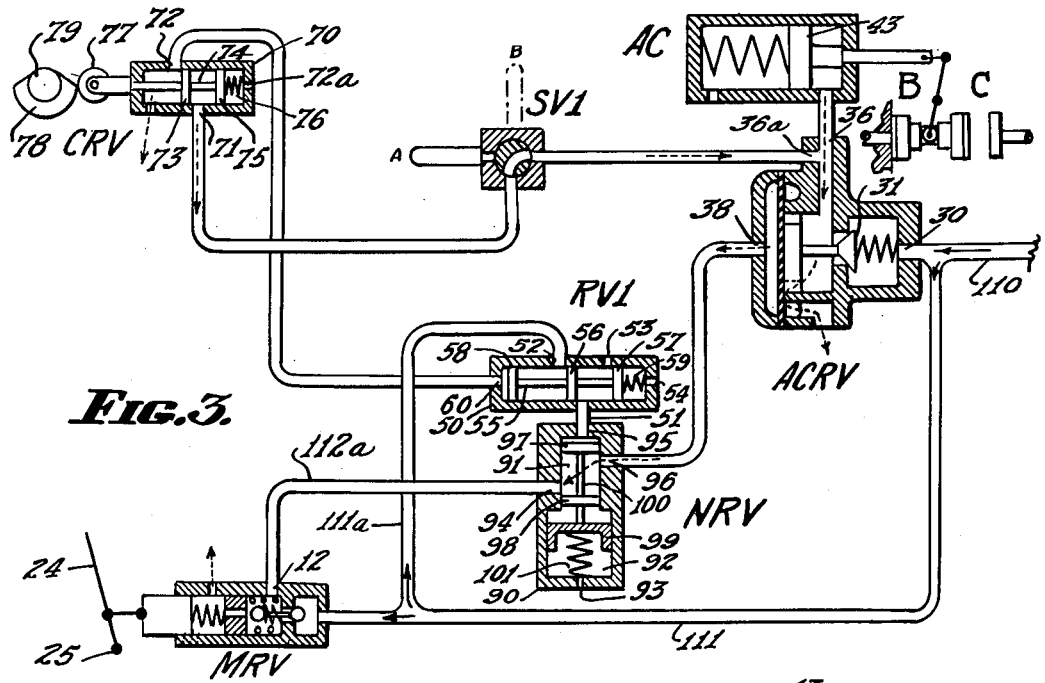
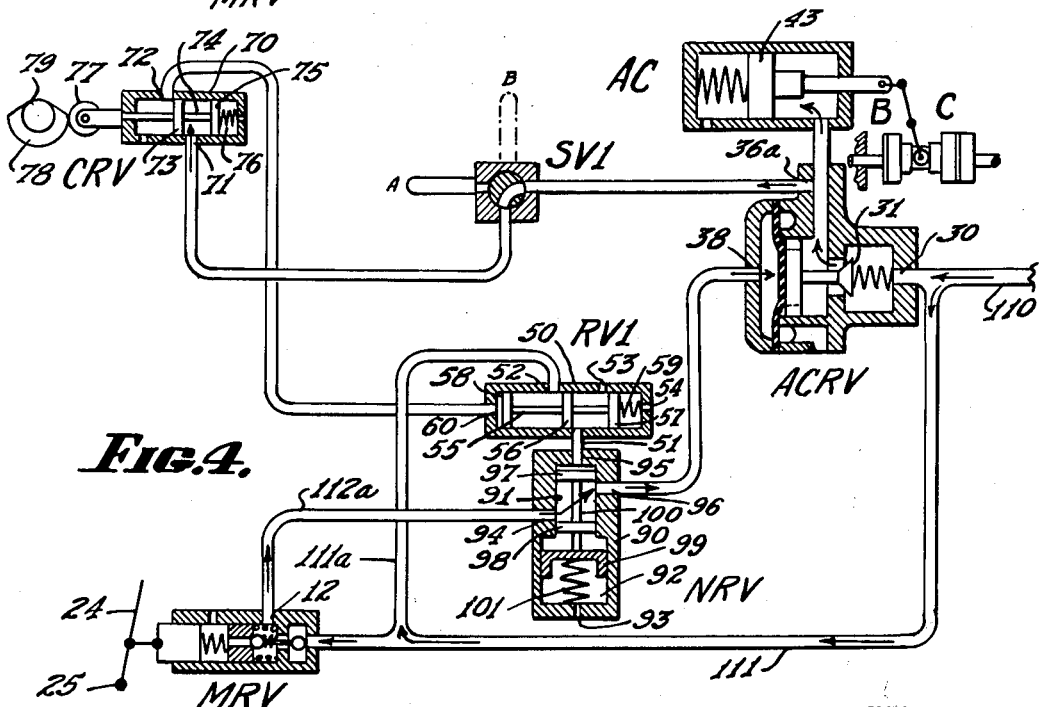

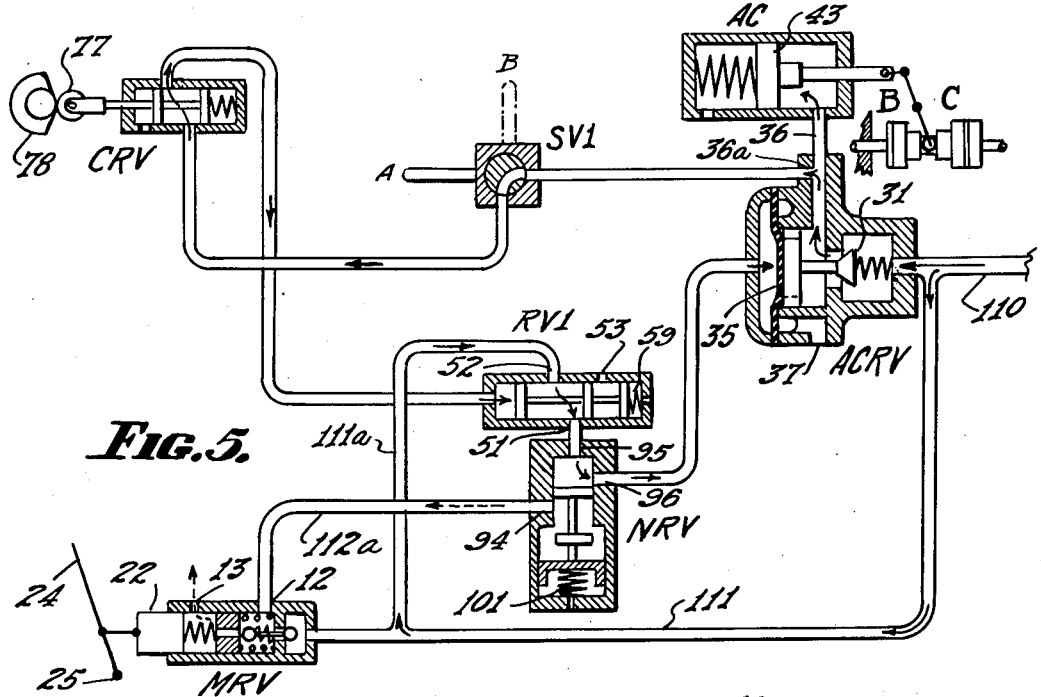
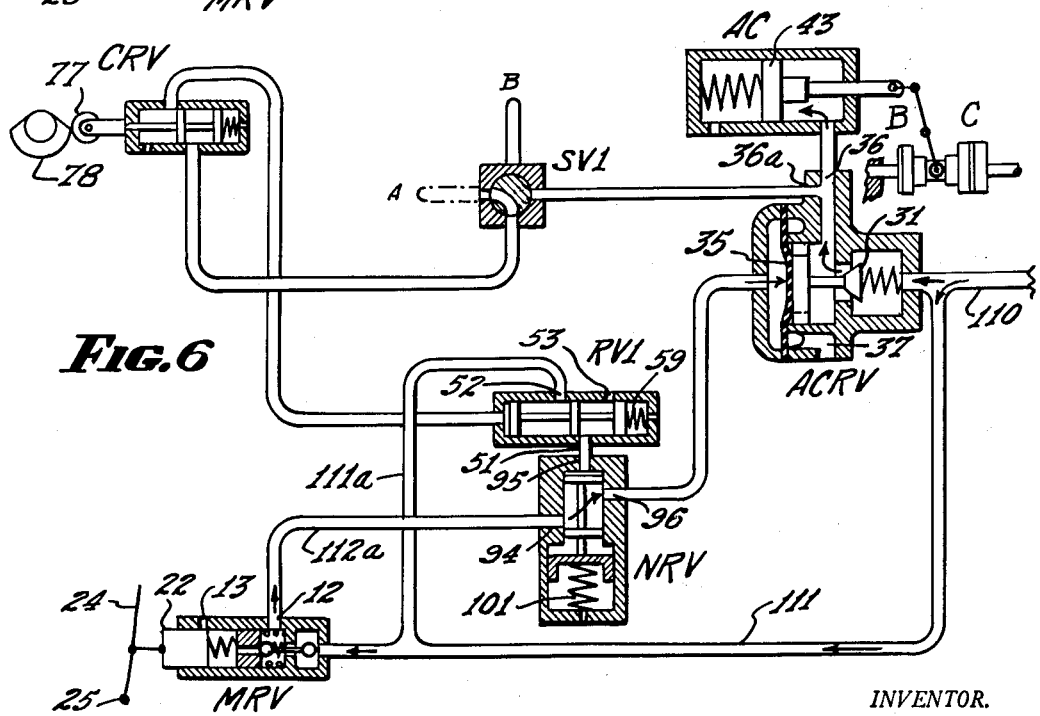

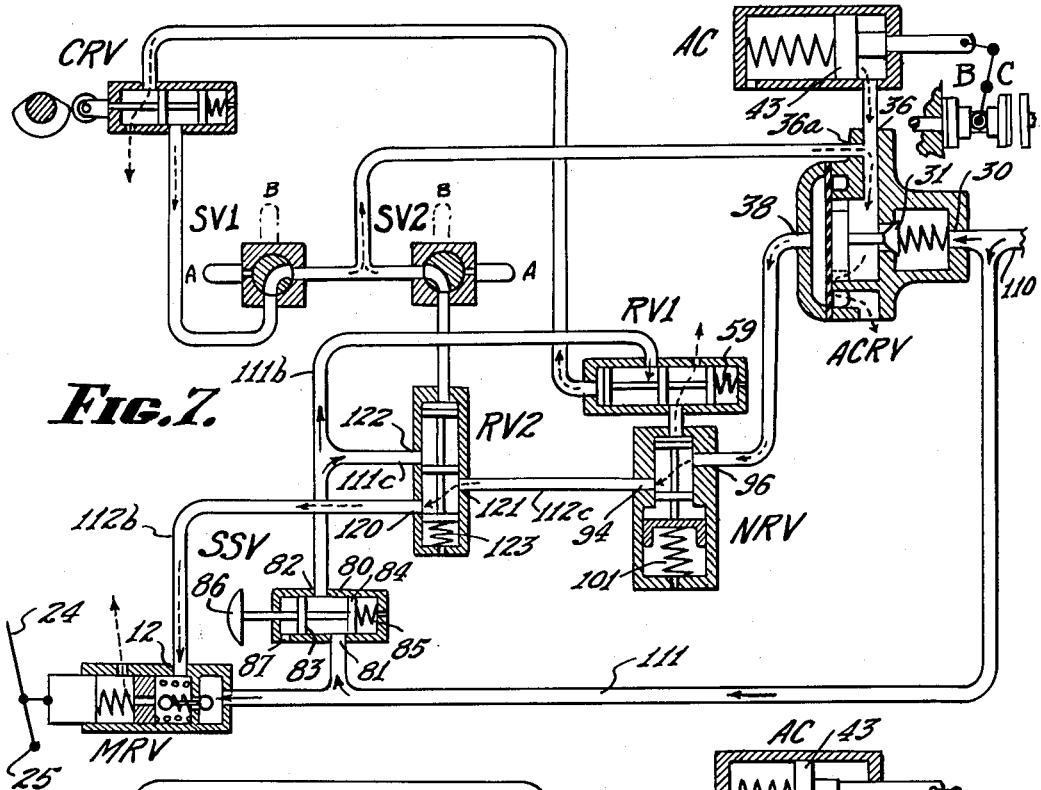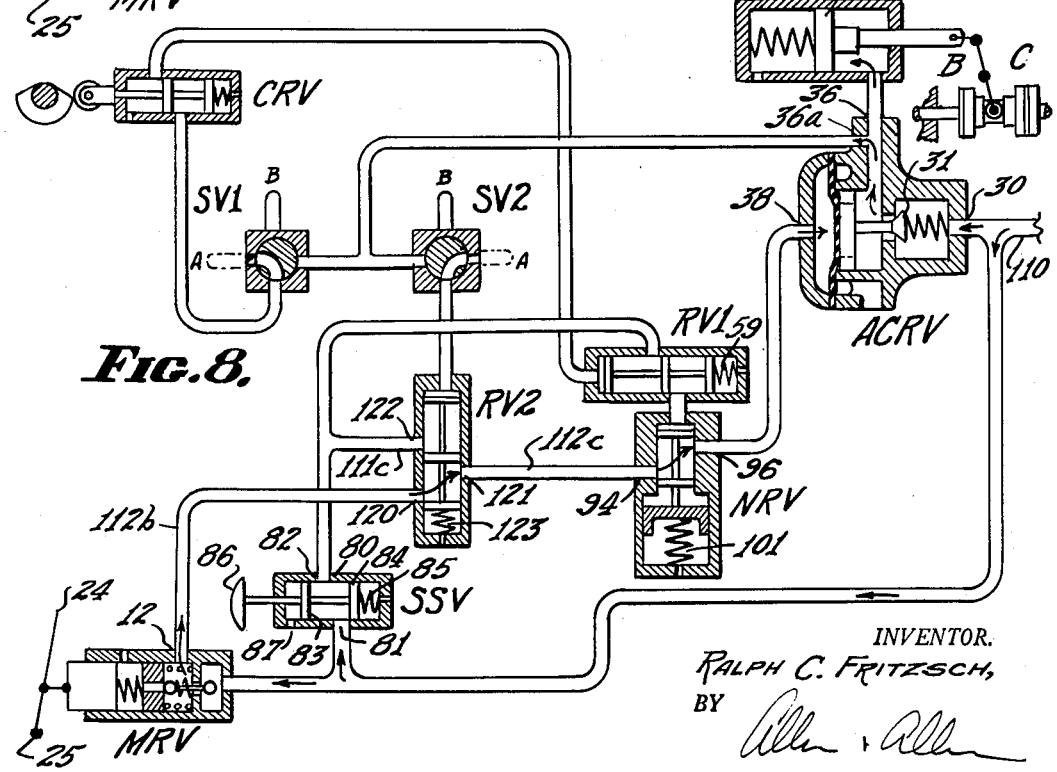

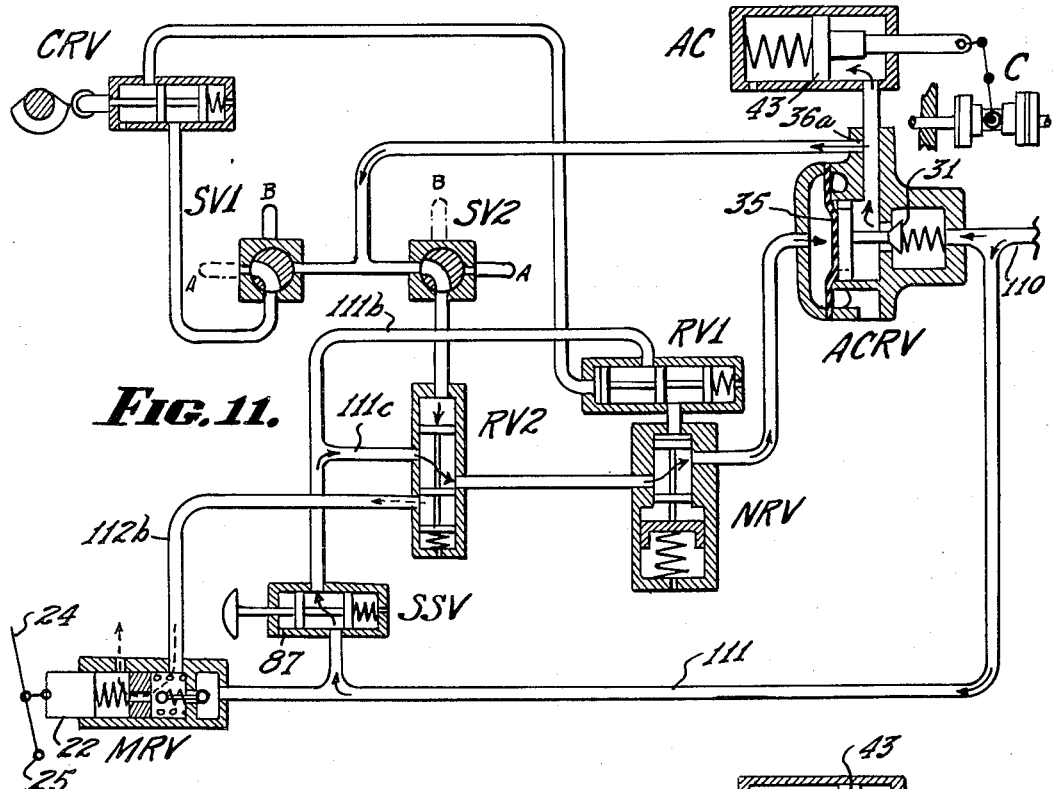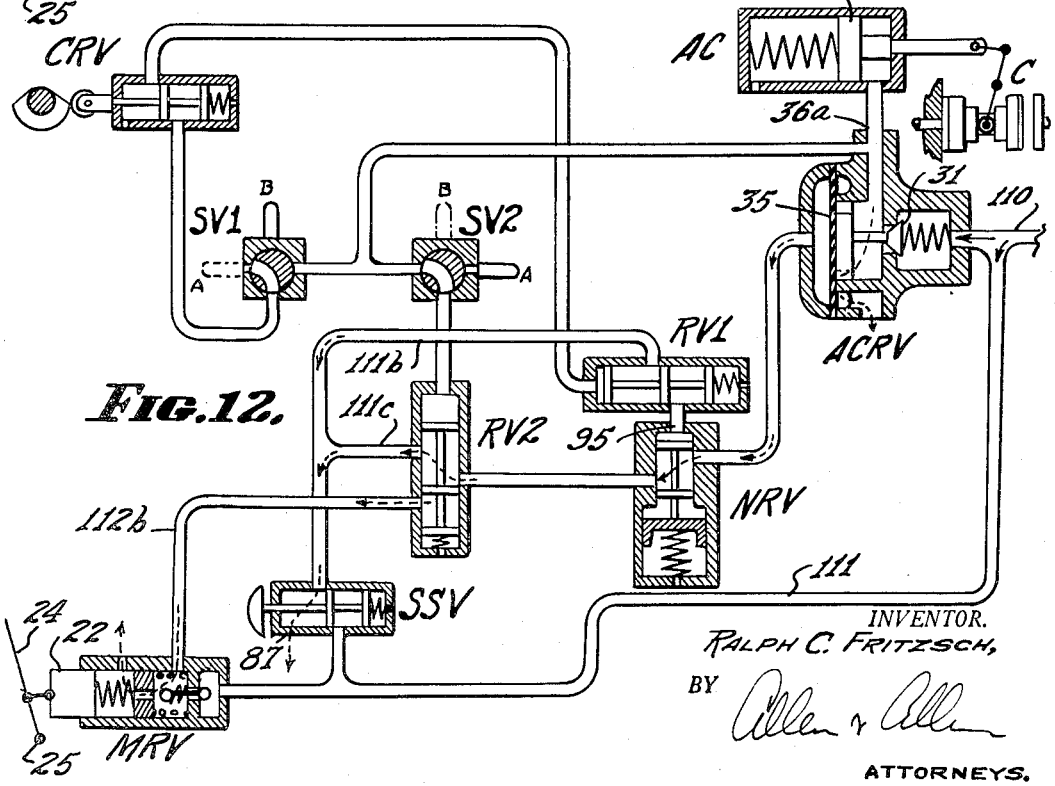

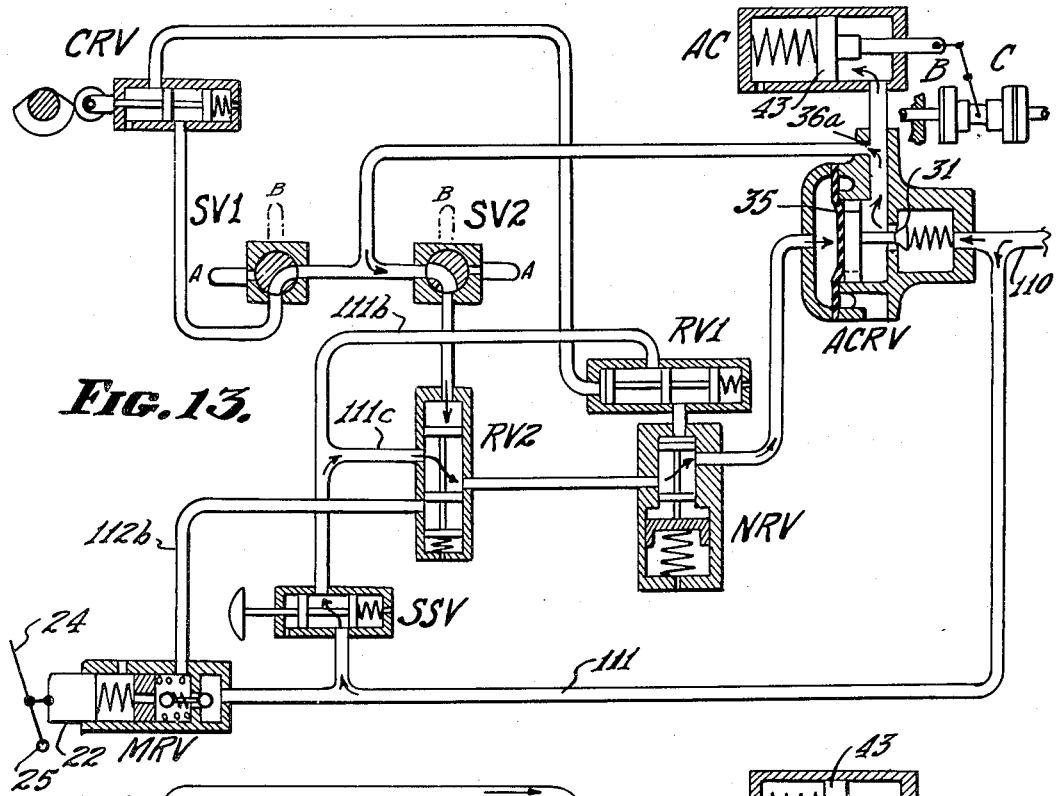
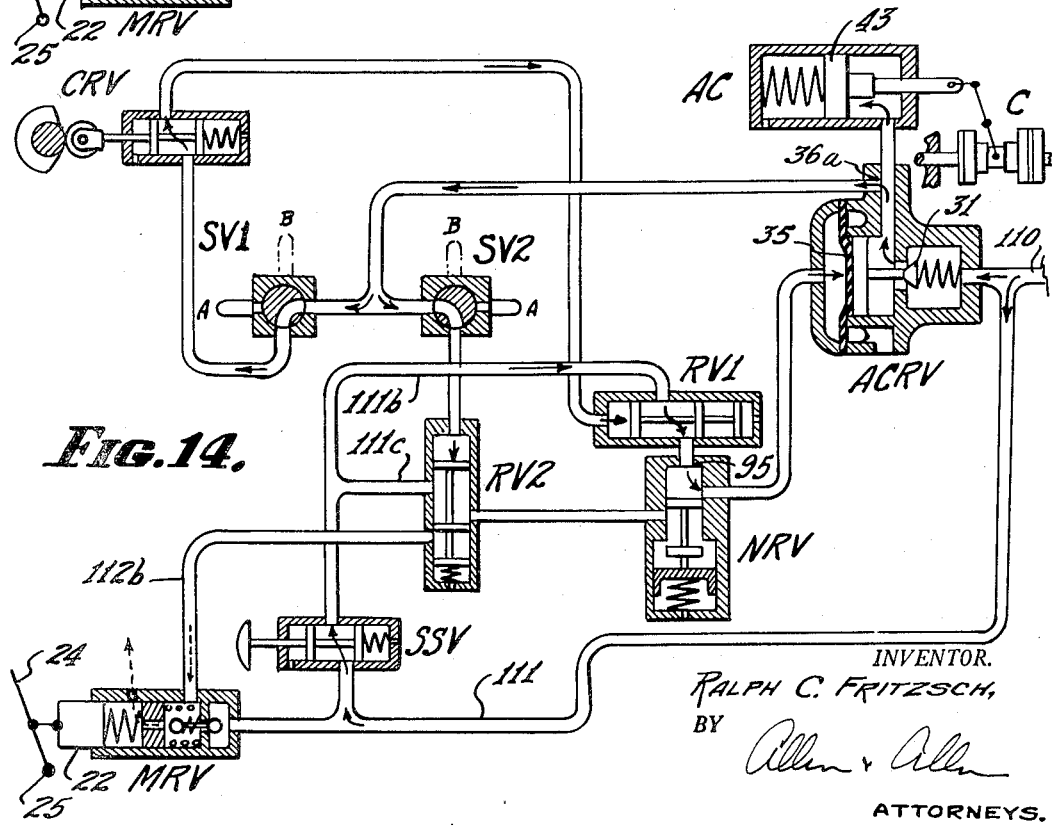

United States Patent Office 2,734,609
Patented Feb. 14, 1956

2,734,609

PNEUMATIC CLUTCH CONTROL

Ralph C. Fritzsch, Cincinnati, Ohio, assignor to The Cincinnati Shaper Co., Cincinnati, Ohio, a corporation of Ohio Application April 9, 1953, Serial No. 347,798

13 Claims. (Cl. 192—129)

This invention relates to a pneumatic clutch control such as is useful particularly in connection with the operation of press brakes.

The conventional press brake is provided with a shaft having eccentrics upon which a ram is mounted so that as the shaft rotates, the ram is caused to move down and up. This shaft is driven by a continuously running electric motor through a friction clutch.

In the conventional press brake, the friction clutch is operated through a mechanical linkage by a hand lever or foot pedal and generally requires the output of considerable muscular force. In some press brakes a force as high as 100 pounds is required to operate the clutch. Thus, whether the clutch is hand operated or pedal operated, the operation is very exhausting. The movement of the ram cannot be controlled with the nicety which is desired and for this reason improper operations with resulting damage to the material being operated upon or injury to the operator or both result.

For some press brake operations it is desirable to have full and complete delicate control over the movement of the ram during its entire cycle of the down-stroke and up-stroke. For other press brake operations it is desirable to have such full and delicate control only during the down-stroke of the ram in which case it is desirable that at the end of the down-stroke the ram return to its uppermost position and stop.

In connection with still other operations it is desirable that the ram go through one complete cycle including the down-stroke and an up-stroke when the operating lever is actuated. For still other operations it is desirable that when the machine is started it continue to run until it is deliberately stopped.

With the foregoing considerations in mind, it is an object of the present invention to provide a system of controls for a press brake and the like which is extremely flexible so that by proper positioning of certain valves any one of the four types of operation mentioned above may be carried out.

It is another object of the invention to provide a control system which makes operation of the clutch physically easy so as not to fatigue the machine operator. This of course results in increased efficiency and better production.

It is still another object of the invention to provide a control system which gives to the operator an extremely delicate control of the movement of the ram by making it possible for him to slip the clutch 50 as to make the ram creep, whereby more delicate operations can be performed than has heretofore been possible.

Again it is yet another object of the invention to provide a control system as outlined above which can, without great expense, be applied to existing machines as well as being incorporated in machines built hereafter.

These and various other objects of the invention, which will be pointed out in more detail hereinafter or which will be apparent to one skilled in the art upon reading this specification, I accomplish by that certain construction and arrangement of parts of which I shall now describe several exemplary embodiments.

Reference is made to the drawings forming a part hereof all of which are diagrammatic representations of pneumatic circuits according to the invention.

Figure 1 is a diagram of a simple control circuit in exhaust position.

Figure 2 is a view similar to Figure 1 showing the position of the parts in operating position.

Figure 3 is a diagram of a somewhat more complex arrangement showing the parts in exhaust position.

Figure 4 is a view similar to Figure 3 showing the position of the parts during the first half of a cycle with the selector valve in one position.

Figure 5 is a view similar to Figure 4 showing the position of the parts during the second half of the same cycle.

Figure 6 is a view similar to Figures 4 and 5 but showing the position of the parts with the selector valve in a different position.

Figure 7 is a diagram of a still more complex arrangement showing the parts in the exhaust position.

Figure 8 is a view similar to Figure 7 showing the position of the parts with both selector valves closed.

Figure 11 is a diagram showing the position of the parts with the other selector valve open and the first selector valve closed.

Figure 12 is a view similar to Figure 11 showing the parts in exhaust position after an operation according to Figure 11.

Figure 13 is a diagram showing the position of the parts with both selector valves open during the first half of a cycle, and Figure 14 is a view similar to Figure 13 showing the position of the parts during the second half of the same cycle.

Figure 9:
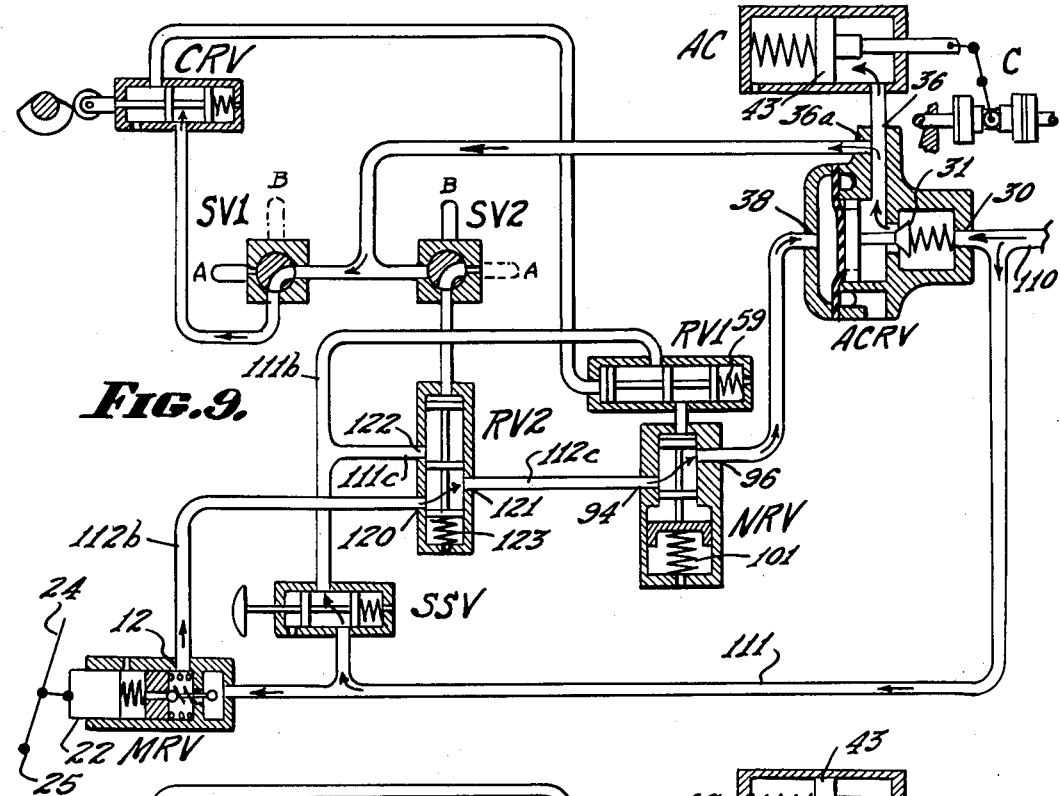
Figure 9 shows the position of the parts with one of the selector valves open during the first half of a cycle.

During the description which follows, the various operations performed by the machine will be designated by terms "inch," "long," "short," and "run."

By the term "inch" I mean an operation wherein the engagement of the clutch, and, therefore, the movement of the ram is controlled in direct proportion to the movement of an actuating lever. In this operation the ram may be moved throughout its cycle by very small increments, and if the actuating lever is held in actuating position the machine will run as long as it is so held.

By the term "long" I mean an operation in which inching control is provided during the first half of the cycle or, in other words, during the down-stroke of the ram and in which at the end of the down-stroke the ram, without action on the part of the operator, automatically returns to the top of its stroke and stops.

By the term "short" I mean a one cycle operation wherein when the actuating lever is operated the ram moves through a single cycle including a down-stroke and up-stroke. In the second half of the "long" cycle, and in the "short" cycle, there is provided an automatic stop, non-repeat feature. Thus, if the operator does not release the actuator, the ram still stops at the end of the up-stroke. Also, once the automatic portion of the cycle has been initiated, it proceeds to completion even if the operator releases the actuator.

By the term "run" I mean an operation where, when the actuating lever is operated, the machine begins to run and continues to run until a stop element is actuated. During a run operation, the operator need not continue to operate the actuating lever because the machine will continue to run when the actuating lever is released.

In the course of this description, I will refer to various valves and for the sake of clarity I will now describe the various valves used before describing their connections and their functions.

One of the valves used in my control system is referred to as a mechanical regulating valve. Such valves are available commercially as exemplified by the Bendix Westinghouse throttle valve, No. 221946, Bendix Westinghouse D-1 valve, No. 230879, the Westinghouse air brake H3 Controlair and the Midland graduated valve. This valve is indicated in the various drawings at MRV and I shall describe one embodiment of it briefly with reference to Figure 1.

The mechanical regulating valve MRV comprises a generally tubular casing 10 having an inlet opening 11, an outlet opening 12 and an exhaust opening 13. Between the inlet and outlet openings is a web 14 having an aperture 15 which may be closed by a ball 16.

Between the outlet opening 12 and the exhaust opening 13 is disposed a plug member 17 having an aperture 18 therein. The aperture is adapted to be closed by a ball 19 which is connected to the ball 16 by a pin as shown. The balls 16 and 19 are normally held in the position shown by a spring 20. The plug 18 is urged to the left in Figure 1 by a spring 21. A plunger 22 actuates the plug 17 through a spring 23 and the plug 22 is operated by a lever 24 pivoted at 25. The lever 24 may of course be a manually operated lever or it may, if desired, be a foot pedal.

From the foregoing description it will be clear that in the position of Figure 1 the outlet 12 is connected to atmosphere through the exhaust 13 through the passage 18 and that inlet air cannot pass from the inlet 11 to the outlet 12. When the actuating lever 24 is moved to the position in Figure 2, the plug 22 through the spring 23 pushes the plug 17 toward the right which causes the ball 19 to close the passage 18 thereby cutting off the outlet 12 from the exhaust 13. Further movement to the right is transmitted through the pin from the ball 19 to the ball 16 which is lifted off the opening 15, thereby establishing communication between the inlet 11 and the outlet 12.

This diagrammatic representation is characteristic of the commercially available valves mentioned above and the valve itself forms no part of the present invention.

Another valve utilized in the invention is an air controlled regulating valve identified in the drawings as ACRV. This valve is also a commercially available valve and is exemplified by the Bendix Westinghouse relay valve, No. 223053 and the Westinghouse air brake H5, Relayair. I will briefly describe one embodiment of this valve with reference to Figures 1 and 2.

The valve has an air inlet at 30 and a valve element 31 seated by a spring 32 closes an opening 33. The valve element 31 is connected by a stem 34 to a diaphragm 35. The valve has an outlet at 36, an exhaust opening at 37 and a control air inlet at 38.

In operation it will be understood that the inlet 30 is connected to a supply of air under pressure and the outlet 36 is connected to the device to be operated. The control air inlet 38 is connected to a source of control air, as for example the mechanical regulating valve MRV.

In the position shown in Figure 1, it will be clear that the air under pressure cannot pass the valve element 31 and the device connected to the outlet 36 is connected to atmosphere through the exhaust opening 37.

If now control air is applied to the inlet 38 as shown in Figure 2, the diaphragm is moved to the right and its movement is transmitted by the stem 34 to the valve element 31 which is unseated to permit air from the source under pressure to pass through the inlet 30, through the aperture 33 to the outlet 36.

This valve itself does not form a part of the present invention but the diagrammatic representation is representative of the several commercially available air operated regulating valves mentioned above.

Another element shown in Figures 1 and 2, and which forms no part of the present invention, is the single acting air cylinder AC. This is a standard commercially available article and comprises a cylinder 40 having an inlet 41 and an exhaust 42. A piston 43 is normally held in the position of Figure 1 by a spring 44. The piston 43 has a rod 45 which is connected to the device to be operated.

When air is admitted at 41 the piston is moved to the left, as seen in Figure 2, and air behind the piston passes out through the exhaust 42. When the inlet 41 is connected to exhaust, the spring 44 returns the piston 43 to the position of Figure 1.

Another valve is indicated in the drawings at RV1. This valve is commercially available as exemplified by the Hannifin C-10-25 and C-12-25 relay valves and the Logan Model 6653. I will briefly describe one embodiment of this valve with reference to Figures 3 and 5. The valve comprises a cylindrical body 50 and is provided with an outlet 51, an inlet 52 and exhaust openings 53 and 54. Within the cylindrical body 50 are the valve elements 56, 57 and an actuating piston 58, all mounted on a common stem 55. The valve is normally held in the position of Figure 3 by a spring 59.

In the position of Figure 3 the outlet 51 is open to atmosphere through the exhaust opening 53. When air is supplied to the opening 60, the piston 58 is pushed to the right against the spring 59 and the valve element 56 is moved to a position beyond the outlet opening 51 thereby cutting the outlet 51 off from the exhaust 53 and connecting it instead with the inlet 52. This position is illustrated in Figure 5.

Another valve used in certain embodiments of the invention is indicated at RV2. This valve is the same type of valve as RV1 and need not be described further. The only difference between the valves RV1 and RV2 in the present invention is that the exhaust opening of RV1, which is indicated by the numeral 53, is used also as an inlet in the valve RV2.

Still another valve used in the invention is a ram valve which I have designated CRV. This is also a commercially available valve as exemplified by the Hannifin C-9-25, and the Logan Model 6256. As seen in Figure 3, this valve has a cylindrical casing 70 and has an inlet 71 and an outlet 72, an exhaust port 72a, and a valve element 73 mounted on a stem 74. The stem 74 is not affected by changes in pressure between the elements 73 and 75, since the pressure between these elements equalizes itself. The element 75 serves as an abutment for the spring 76 which normally holds the valve in the position of Figure 5 in which the inlet 71 is connected to the outlet 72. When the stem 74 is moved to the right, to the position of Figure 3, the valve element 73 cuts the inlet 71 off from the outlet 72. The stem 74 has mounted on its end a roller 77 which is adapted to engage a cam 78 on a shaft 79. According to the present invention, as will be described in more detail hereinafter, the shaft 79 is the eccentric ram shaft of the press brake so that the valve CRV is operated in timed relation to the operation of the ram.

The valves SV1 and SV2 are ordinary selector valves of the two position, three way type, which are commercially available as exemplified by Republic 710-3-⅛" or Imperial No. 108-HD. These valves have two positions, one being an on position and one being an off position.

The safety stop valve indicated at SSV is also a commercially available valve as exemplified by the Hannifin C3-25. This valve is similar to the valve CRV except that it is operated by hand or foot. As seen in Figure 7, it comprises a tubular casing 80 having an inlet 81 and an outlet 82 and a valve element 83. The member 84 serves as an abutment for the spring 85 which normally holds the valve in the position of Figure 7 permitting air to flow from the inlet 81 to the outlet 82. When the element 86 is pushed in by hand or foot, the valve element 83 cuts the inlet off from the outlet and connects the outlet 82 with an exhaust opening 87.

There is one additional valve utilized in this invention which forms the subject matter of my copending application, Serial No. 347,799, filed April 9, 1953. This is the non-repeat valve indicated at NRV. This valve has a generally tubular casing 90 which has a portion having a smaller bore 91 and a spring section having a larger bore 92. An exhaust opening 93 is provided to prevent any pressure build-up in the spring section of the valve, while the portion having the smaller bore is provided with a first inlet 94, a second inlet 95 and an outlet 96. Within the portion 91 there are provided the pistons or valve elements 97 and 98 and within the portion 92 there is provided a larger piston 99. The members 97, 98 and 99 are connected by a stem 100 and the parts are maintained normally in the position of Figure 3 by a spring 101. In this position the inlet 94 and outlet 96 are connected. It will be understood that the pressure of the inlet air entering through the port 94 presses with equal force against the members 97 and 98 so that the spring 101 maintains the parts in the position shown in Figure 3.

If now pressure is applied through the second inlet 95 as illustrated for example in Figure 5, that pressure bearing against the upper side of the member 97 forces the assembly downward, compressing the spring 101. It will be clear that as soon as the member 98 enters the chamber 92, air pressure entering at 94 is applied against the larger piston 99, forcing it down and holding it down even though the inlet 95 is exhausted. When the piston is in the down position of Figure 5, the inlet 95 is connected to the outlet 96 through the upper chamber 91. The maintenance of air pressure through the inlet 95 will hold the piston in the down position even though the inlet 94 is exhausted. Therefore, in order for the parts to return to the position of Figure 3 under the influence of the spring 101, it is necessary for both inlets 94 and 95 to be exhausted to atmosphere. As mentioned above, this valve forms the subject matter of a separate application and will not be discussed further herein.

Having now described the various individual elements utilized in my invention, I shall describe it in its simplest form with reference to Figures 1 and 2. In all the figures, the friction clutch controlling the ram of the press brake is indicated at C and a direct link brake which is engaged when the clutch is disengaged is shown at B. The clutch is connected through a mechanical linkage to the rod 45 of the piston 43 of the air cylinder AC so that when the air cylinder is operated to move the piston 43 to the left the clutch will be engaged and the ram will operate.

In the embodiment of Figures 1 and 2 the outlet of the air controlled regulating valve ACRV is connected to the inlet of the air cylinder AC. The inlet 30 of the valve ACRV is connected to a source of air under pressure by a line 110. The inlet 11 of the valve MRV is also connected to the source of air under pressure through the line 111. The outlet 12 of the valve MRV is connected to the inlet 38 of the valve ACRV by a line 112.

With the parts in the position of Figure 1, air under pressure from the line 110 cannot pass the valve element 31 and it cannot pass through the line 111 past the valve element 16. The left side of the air cylinder AC is exhausted to atmosphere at 42 and the right side of the piston 43 is exhausted to atmosphere through 41, 36 and 37. The left side of the diaphragm 35 is exhausted to atmosphere through the line 112 and at 12, 18 and 13. The clutch at this time is disengaged and the brake is engaged.

If now the lever 24 is actuated, air from 110 passes through the line 111 through MRV and 38 and distorts the diaphragm 35 as shown in Figure 2. Distortion of the diaphragm 35 closes the exhaust to 37 and raises the element 31 from its seat so that air from 110 can pass through 30, 33, 36 and 41 to move the piston 43 to the left engaging the clutch C. Thus, the valve MRV is simply a control valve for the valve ACRV, and handles only a very small volume of air. It is, therefore, physically easy to operate and produces very delicate control of the valve ACRV and therefore of the piston 43 and therefore of the clutch C. There is thus provided a much finer control than "inch" as the term is generally applied to electrical controls. With electrical controls the term "inch" is used in the same sense as "jog," where the ram jumps a small increment of its stroke each time the control is actuated. With my control, the clutch can be made to slip, and therefore the ram can be made to creep or to jog, as desired. With this arrangement, as long as the lever 24 is actuated the machine will run and of course it is possible to inch the ram throughout its cycle. The clutch is operated in direct proportion to the actuation of the valve MRV.

Coming now to Figures 3 to 6 inclusive, I have shown a slightly more complex control arrangement embodying the basic principles of the arrangement of Figures 1 and 2 by providing for an additional type of operation. Whereas the arrangement of Figures 1 and 2 provides only for inching control as described above, the arrangement of Figures 3 to 6 inclusive provides for inching control and also for what I have designated "long" operation, wherein inching control is provided during the first half of the cycle only.

This arrangement employs the mechanical regulating valve MRV as before and the air controlled regulating valve ACRV and the air cylinder AC for controlling the clutch C as before. Again a line 110 supplies air from a source under pressure to the valve ACRV and air under pressure is supplied through a line 111 to the valve MRV. The outlet of MRV is again connected to the inlet 38 of ACRV by a line 112a and the outlet of ACRV is connected to AC.

Additionally, I provide a ram valve CRV operated as heretofore described, a selector valve SV1, a relay valve RV1, and a non-repeat valve NRV. The inlet of CRV is connected through the valve SV1 to a branch outlet of regulated air 36a. The outlet of CRV is connected to RV1 to operate the same. The inlet 52 of RV1 is connected to the source of air under pressure through the branch line 111a and the outlet 51 of RV1 is connected to the second inlet 95 of the non-repeat valve NRV.

With the valve SV1 in position B or closed, the valve CRV is in effect cut out of the circuit and the valves RV1 and NRV are effectively removed from consideration. Therefore, with the parts in the position of Figure 6, the operation is identical to that disclosed in connection with Figures 1 and 2.

Now when the valve SV1 is shifted to position A as shown in Figures 4 and 5, the operation is somewhat different. It will be observed that during the first half of the cycle, as shown in Figure 4, CRV is closed because the cam follower 77 is on the rise of the cam 78. Therefore, even though SV1 is open the operation during the first half of the cycle is exactly as has been described above.

When the ram reaches the bottom of its stroke, the cam follower 77 drops off the rise of the cam 78 whereby the valve CRV opens as shown in Figure 5. Now with both SV1 and CRV open, regulated air from the branch opening 36a is supplied to RV1 whereby RV1 is shifted from the position of Figure 4 to the position of Figure 5. This immediately provides for communication between the inlet 52 and the outlet 51 of RV1 so that air coming through lines 110, 111 and 111a passing through RV1 enters the inlet 95 of NRV shifting NRV from the position of Figure 4 to the position of Figure 5 and that air which enters through the inlet 95 now passes through the outlet 96 and is applied against the diaphragm 35.

The clutch C therefore remains engaged even though the actuating lever 24 of MRV is released so that the inching control is cut out and the ram moves upward. This is true even if the clutch is not fully engaged when the cam follower 77 drops off the cam. When this happens, the flow of line pressure from 111a to the diaphragm 35 will produce complete engagement of the clutch so that the ram returns to the top of its stroke as quickly as possible.

When the ram reaches the top of its stroke, the follower 77 of CRV again encounters the rise of cam 78, shifting CRV so that port 71 is blocked and port 72 is connected to exhaust through the valve CRV. The pilot section of the valve RV1 is exhausted through ports 60 and 72. As soon as this happens, the spring 59 of RV1 returns RV1 to its original position blocking port 52 and connecting port 95 of NRV to exhaust through 51 and 53 of RV1.

If inlet 94 has previously been exhausted through 13 by release of the lever 24, the spring 101 returns NRV to its original position and air to the left of the diaphragm 35 is exhausted through NRV and MRV. This causes valve element 31 to close and permits air to the right of the piston 43 to be exhausted through 37. Should the lever 24 remain in the engaged position, pressure will still be present at inlet 94. Valve NRV will remain in the activated position exhausting all of the air from diaphragm 35 through NRV and RV1.

It will be seen that the arrangement of Figures 3 to 6 inclusive provides for greater flexibility in that a long operation is possible as well as an inching operation.

In Figures 7 to 14 inclusive, I have illustrated a complete arrangement making it possible to perform any of the four above mentioned operations by appropriate seating of certain valves. It will be understood that with the elimination of certain valves arrangements can be achieved for performing any one, any two, or any three of the four operations in question.

In the embodiment of Figures 7 to 14 inclusive I employ the air cylinder AC for operating the clutch C and the air controlled regulating valve ACRV and mechanical regulating valve MRV. Again the outlet 36 of ACRV is connected to AC and again air under pressure from a source is connected to the inlet 30 of ACRV through a line 110 and again air from the source under pressure is supplied through a branch line 111 to MRV. Similarly, as in the embodiment of Figures 3 to 6 inclusive, I use the non-repeat valve NRV the outlet of which 96 is connected to the inlet 38 for operating the diaphragm of ACRV and again the inlet 94 of NRV is supplied from the outlet 12 of MRV. The relay valve RV1 is connected as before to NRV and the valve CRV again receives air from a branch outlet 36a of ACRV through a selector valve SV1 and in its turn supplies air to RV1 for shifting its position.

In addition to the elements utilized in the arrangement of Figures 2 to 6 inclusive, I provide in the line 111b, which supplies RV1, a safety stop valve SSV. In this embodiment there is provided an additional relay valve RV2 and an additional selector valve SV2. The inlet 120 of RV2 is connected to the outlet 12 of MRV by a line 112b and the outlet 121 of RV2 is connected to the inlet 94 of NRV by a line 112c. The inlet 122 of RV2 is connected to the line 111b by branch line 111c. Air for shifting RV2 is supplied through the branch outlet 36a of ACRV and through the selector valve SV2.

A spring 123 of RV2, the spring 59 of RV1 and the spring 101 of NRV, as well as the spring 85 of SSV, hold these valves normally in the position of Figure 7.

The four different types of operation are achieved by appropriate setting of SV1 and SV2.

Taking up first a setting where both SV1 and SV2 are closed, as shown in Figure 8, it will be clear that CRV is effectively cut out of the circuit and that RV1 and RV2 are effectively cut out. In this condition, therefore, the situation is as was outlined in Figures 1 and 2 and the ram may be inched by actuating the lever 24 throughout the cycle of the ram and no other operation can be performed.

Figure 10:
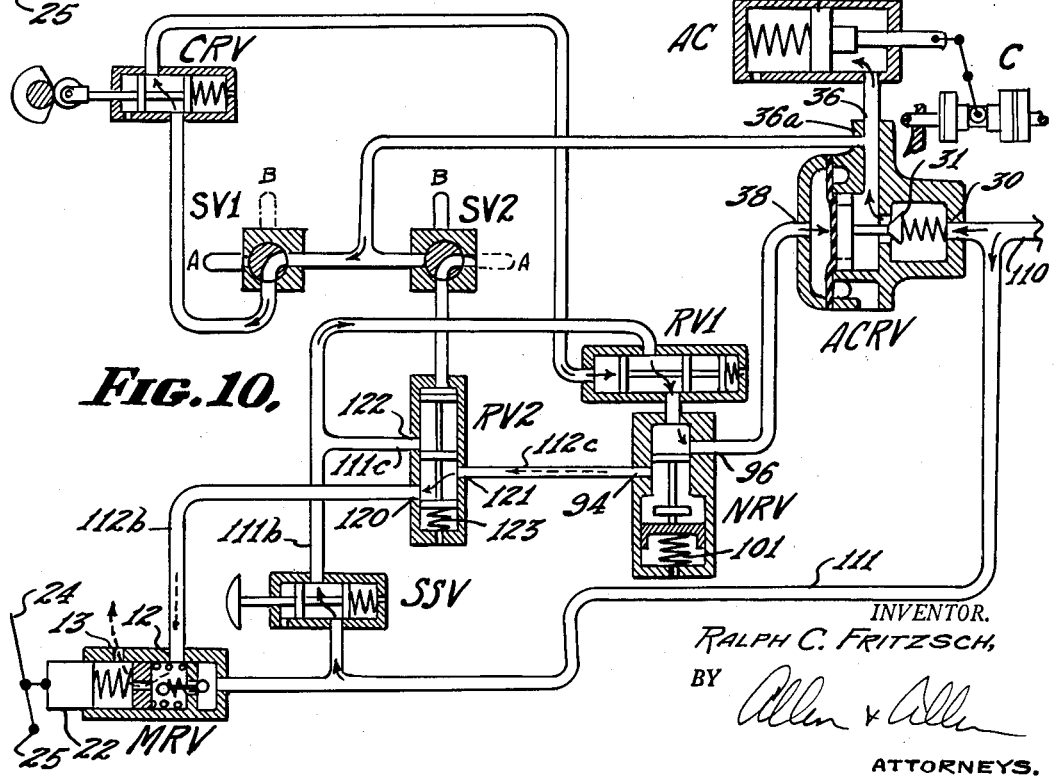
Figure 10 is a diagram similar to Figure 9 showing the parts during the second half of the same cycle.

If now SV1 is opened and SV2 remains closed, it will be understood that CRV and RV1 can come into play while with SV2 closed RV2 is effectively eliminated. Under these conditions, therefore, the situation is as was described in connection with Figures 3 to 6 when the selector valve SV1 was open. The machine will then perform what I have designated as a "long" operation. This situation is illustrated in Figures 9 and 10 wherein Figure 9 shows the position of the elements during the first half of the cycle and Figure 10 shows the position of the parts during the second half of the cycle.

If now the selector valve SV1 and SV2 are reversed, as illustrated in Figures 11 and 12 where SV1 is now closed and SV2 is open, we find that CRV is cut out of the circuit as is RV1. However, RV2 is now in the circuit and SSV can become effective. The operation of the circuit in the condition of Figures 11 and 12 is as follows. When the actuating lever 24 is actuated, air coming through 110 and 111 passes through MRV and through RV2 (which initially is in the position of Figures 7 and 8) and through NRV to actuate ACRV. As soon as ACRV is actuated to lift the valve member 31 from its seat, air from 110 passes through ACRV to actuate AC. Air through the branch outlet 36a passes through SV2 and shifts RV2 to the position of Figure 11. This permits air from line 111 passing through SSV and through branch line 111c to pass through RV2 and NRV so that the clutch remains engaged even though lever 24 is released and MRV is closed. In this condition then the clutch will remain engaged until SSV is manually or pedally actuated. This blocks the pressure port connected to line 111 and connects line 111c to exhaust port 37, therefore, air to the left of the diaphragm 35 is exhausted through NRV, RV2 and SSV at 87 and the clutch C is disengaged.

In Figures 13 and 14, I have shown both of the valves SV1 and SV2 in open position. In this position the machine is set up for what I have designated a "short" operation wherein upon actuation of the lever 24 the ram goes through one complete cycle. The operation is as follows. Air under pressure coming through 110 and 111 as before, passes through MRV when 24 is actuated and through 112b and RV2 (which initially is in the position of Figures 7 and 8) and through NRV to actuate the diaphragm 35. As before, this results in lifting the valve element 31 from its seat and permitting air from 110 to actuate AC and engage the clutch. Regulated air passing through the branch outlet 36a passes through SV2 and shifts RV2 to the position of Figure 13 whereupon air from 111, instead of passing through MRV, passes through SSV and line 111c, through RV2 and NRV to maintain pressure on the diaphragm 35. The clutch will, therefore, remain engaged even though the lever 24 is released.

During the first half of the cycle or down-stroke, CRV is closed but upon reaching the bottom of the stroke of the ram, CRV opens as previously described so that now regulated air from the branch outlet 36a passes through SV1 and CRV so as to shift RV1 to the position of Figure 11. When RV1 is so shifted, NRV is also shifted as previously described and now air from 111 passing through SSV bypasses RV2 and instead flows through 111b and through RV1 and through the second inlet 95 of NRV and thence to the diaphragm 35.

With the parts in the position of Figure 14, as just described, when CRV closes at the end of the up-stroke of the ram, air is cut off from RV1 which shifts back under the influence of its spring to the position of Figure 13, blocking off air from line 111b and exhausting pilot air from diaphragm 35 through NRV and RV1, disengaging the clutch. The pilot section of RV2 is exhausted through SV2 and ACRV. Thus, with the arrangement of Figures 13 and 14 when the lever 24 is once actuated the machine goes through one complete cycle and stops automatically.

As pointed out above, Figures 7 to 14 inclusive show the complete setup for making it possible to perform any one of four operations. It should be understood that in the arrangement of Figures 7 to 14 inclusive where both selector valves SV1 and SV2 are closed as in Figure 8, the arrangement is substantially that of Figures 1 and 2 and all unnecessary valves and lines could be eliminated. Similarly, where SV1 is open and SV2 is closed, as in Figures 9 and 10, the setup is the same as in Figures 3 to 6 inclusive and all unnecessary valves and lines could be eliminated.

Similarly, in the condition of Figures 11 and 12 where SV2 and SV1 is closed, certain valves may be eliminated and for the condition of Figures 13 and 14, where both SV1 and SV2 are open, these valves could be eliminated entirely. It is thus clearly understandable how the disclosure of Figures 7 to 14 inclusive may be used to provide an arrangement for performing any one, any two, any three, or all four of the operations described. It will be understood that except for the valve NRV I make no claim to the specific valves used and have described them only to the extent required for an understanding of the invention. It will be clear that I, therefore, do not intend to limit myself except as set forth in the claims which follow.

While in the claims I have called for a cylinder having a piston operatively connected to the clutch, I intend this language to be inclusive of other well known devices having the same function.

Having now fully described my invention, what I claim as new and desire to secure by Letters Patent, is:

1. An operating mechanism for operating the friction clutch controlling the movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet connected to said mechanical regulating valve, and a second inlet, and an outlet connected to said air controlled regulating valve, and spring means normally holding it in a position connecting said first inlet with said outlet, a relay valve having an outlet connected to said second inlet and having an inlet connected to a source of air under pressure and having spring means to keep it normally closed, a ram valve, means for operating said ram valve in timed relation to the movement of said ram to occupy a closed position during the down-stroke of the ram and an open position during the up-storke of the ram, said ram valve being connected to said regulated air, and being also connected to said relay valve to operate the same; whereby, said ram valve opens at the end of the down-stroke of the ram, thus operating said relay valve to supply air under pressure to said air controlled regulating valve regardless of the position of said mechanical regulating valve, to cause said clutch to remain engaged during the entire up-stroke of said ram, said ram being then stopped by disengagement of said clutch when said ram valve moves to closed position at the end of the up-stroke of said ram, causing said relay valve to shift and exhaust the air from said air controlled regulating valve.

2. An operating mechanism for operating the friction clutch controlling the movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet and a second inlet, and an outlet connected to said air controlled regulating valve, and spring means normally holding it in a position connecting said first inlet with said outlet, first relay valve having an outlet connected to said second inlet, and having an inlet connected to a source of air under pressure, and having spring means to keep it normally closed, a ram valve, means for operating said ram valve in timed relation to the movement of said ram to occupy a closed position during the down-stroke of the ram and an open position during the up-stroke of the ram, said ram valve being connected to said regulated air, and being also connected to said first relay valve to operate the same, a second relay valve connected to said regulated air, said second relay valve having a first inlet connected to said mechanical regulating valve and a second inlet connected to said source of air under pressure, and an outlet connected to the first inlet of said non-repeat valve, whereby, when said mechanical regulating valve is actuated, regulated air is applied to said second relay valve to shift it to a position permitting air from said source to pass through said second relay valve and through said non-repeat valve to supply control air to said air controlled regulating valve regardless of the position of said mechanical regulating valve, and said ram valve opening during the up-stroke of the ram, shifting said first relay valve to by-pass said second relay valve in supplying air under pressure to said air controlled regulating valve until said ram valve closes at the end of the up-stroke of the ram, whereupon said first relay valve shifts under the influence of its spring to exhaust the control air from said air controlled regulating valve.

3. An operating mechanism for operating the friction clutch controlling movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet connected to said mechanical regulating valve, and a second inlet, and an outlet connected to said air controlled regulating valve, and spring means normally holding it in a position connecting said first inlet with said outlet, a relay valve having an outlet connected to said second inlet and having an inlet connected to a source of air under pressure and having spring means to keep it normally closed, a ram valve, means for operating said ram valve in timed relation to the movement of said ram to occupy a closed position during the down-stroke of the ram and an open position during the up-stroke of the ram, a selector valve having an open and a closed position, said ram valve being connected through said selector valve to said regulated air, and being also connected to said relay valve to operate the same when said selector valve is open; whereby, with said selector valve in the closed position said clutch is operated in direct proportion to actuation of said mechanical regulating valve throughout the cycle of said ram, and whereby, with said selector valve in the open position, said ram valve opens at the end of the down-stroke of the ram, thus operating said relay valve to supply air under pressure to said air controlled regulating valve regardless of the position of said mechanical regulating valve, to cause said clutch to remain engaged during the entire up-stroke of said ram, said ram being then stopped by disengagement of said clutch when said ram valve moves to closed position at the end of the up-stroke of said ram, causing said relay valve to shift and exhaust the air from said air controlled regulating valve.

4. An operating mechanism for operating a friction clutch controlling the movement of the ram in a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve, a relay valve in said last named connection having a first inlet connected to said mechanical regulating valve, a second inlet connected to a source of air under pressure and an outlet connected to said air controlled regulating valve, and having spring means to keep it normally in a position connecting said first inlet with said outlet, said relay valve being connected to said regulated air a selector valve in the connection between said relay valve and said regulated air, and a mechanically operated safety stop valve, having spring means to keep it normally open, in the connection between said second inlet and said source of air under pressure; whereby, with said selector valve closed said clutch is operated in direction proportion to the actuation of said mechanical regulating valve throughout the cycle of said ram; and whereby, with said selector valve open, regulated air is supplied to said relay valve to shift it to a position permitting air from said source passing through said safety stop valve to pass through said relay valve to supply control air to said air controlled regulating valve regardless of the position of said mechanical regulating valve, so that said clutch remains engaged until said safety stop valve is closed.

5. An operating mechanism for operating the friction clutch controlling the movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet and a second inlet and an outlet connected to said air controlled regulating valve, and spring means normally holding it in a position connecting said first inlet with said outlet, a first relay valve having an outlet connected to said second inlet and having an inlet connected to a source of air under pressure and having spring means to keep it normally closed, a ram valve, means for operating said ram valve in timed relation to the movement of said ram to occupy a closed position during the down-stroke of the ram and an open position during the up-stroke of the ram, a selector valve, said ram valve being connected through said selector valve to said regulated air, and being also connected to said first relay valve to operate the same when said selector valve is open, a second relay valve connected to said regulated air through said selector valve, said second relay valve having a first inlet connected to said mechanical regulating valve and a second inlet connected to said source of air under pressure, and an outlet connected to the first inlet of said non-repeat valve; whereby, when said selector valve is closed said clutch is operated in direct proportion to the operation of said mechanical regulating valve throughout the cycle of said ram; and whereby, with said selector valve in the open position regulated air is supplied to said second relay valve to shift it to a position permitting air from said source to pass through said second relay valve and through said non-repeat valve to supply control air to said air controlled regulating valve regardless of the position of said mechanical regulating valve, said ram valve opening during the up-stroke of the ram, shifting said first relay valve to by-pass said second relay valve in supplying air under pressure to said air controlled regulating valve until said ram valve closes at the end of the up-stroke of the ram, whereupon said first relay valve shifts under the influence of its spring to exhaust the control air from said air controlled regulating valve.

6. An operating mechanism for operating the friction clutch controlling the movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet and a second inlet and an outlet connected to said air controlled regulating valve, and spring means normally holding it in a position connecting said first inlet with said outlet, a first relay valve having an outlet connected to said second inlet and having an inlet connected to a source of air under pressure and having spring means to keep it normally closed, a ram valve, means for operating said ram valve in timed relation to the movement of said ram to occupy a closed position during the down-stroke of the ram and an open position during the up-stroke of the ram, said ram valve being connected to said regulated air, and being also connected to said first relay valve to operate the same, a selector valve, a second relay valve connected to said regulated air through said selector valve, said second relay valve having a first inlet connected to said mechanical regulating valve and a second inlet connected to said source of air under pressure, and an outlet connected to the first inlet of said non-repeat valve; whereby, with said selector valve closed, said ram valve opens at the end of the down-stroke of the ram thus operating said first relay valve to supply air under pressure to said air operated regulating valve regardless of the position of said mechanical regulating valve, to cause said clutch to remain engaged during the entire up-stroke of said ram, said ram being then stopped by disengagement of said clutch when said ram valve moves to closed position at the end of said up-stroke of said ram, causing said relay valve to close and shut off the air from said air controlled regulating valve; and whereby, with said selector valve in the open position regulated air is supplied to said second relay valve to shift it to a position permitting air from said source to pass through said second relay valve and through said non-repeat valve to supply control air to said air controlled regulating valve regardless of the position of said mechanical regulating valve, said ram valve opening during the up-stroke of the ram, shifting said first relay valve to by-pass said second relay valve in supplying air under pressure to said air controlled regulating valve until said ram valve closes at the end of the up-stroke of the ram, whereupon said first relay valve shifts under the influence of its spring to exhaust the control air from said air controlled regulating valve.

7. An operating mechanism for operating the friction clutch controlling the movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet and a second inlet and an outlet connected to said air controlled regulating valve, and spring means normally holding it in a position connecting said first inlet with said outlet, a mechanically operated safety stop valve having spring means to keep it normally open, a first relay valve having an outlet connected to said second inlet and having an inlet connected to a source of air under pressure through said mechanically operated safety stop valve, a ram valve, means for operating said ram valve in timed relation to the movement of said ram to occupy a closed position during the down-stroke of the ram and an open position during the up-stroke of the ram, a selector valve, said ram valve being connected through said selector valve to said regulated air, and being also connected to said first relay valve to operate the same when said selector valve is open, a second relay valve connected to said regulated air, said second relay valve having a first inlet connected to said mechanical regulating valve and a second inlet connected to said source of air under pressure through said mechanically operated safety stop valve, and an outlet connected to the first inlet of said non-repeat valve; whereby, with said selector valve closed, regulated air is applied to said second relay valve to shift it to a position permitting air from said source passing through said safety stop valve to pass through said second relay valve and through said non-repeat valve to supply control air to said air controlled regulating valve regardless of the position of said mechanical regulating valve so that said clutch remains engaged until said safety stop valve is closed; and whereby, with said selector valve in the open position, the operation is as above, except that when said ram valve is open during the up-stroke of the ram, shifting said first relay valve to by-pass said second relay valve in supplying air under pressure to said air controlled regulating valve until said ram valve closes at the end of the up-stroke of the ram, whereupon said first relay valve shifts under the influence of its spring to exhaust the control air from said air controlled regulating valve.

8. An operating mechanism for operating the friction clutch controlling the movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet and a second inlet and an outlet connected to said air controlled regulating valve, and spring means normally holding it in a position connecting said first inlet with said outlet, a mechanically operated safety stop valve having spring means to keep it normally open, a first relay valve having an outlet connected to said second inlet and having an inlet connected to a source of air under pressure through said mechanically operated safety stop valve, a ram valve, means for operating said ram valve in timed relation to the movement of said ram to occupy a closed position during the down-stroke of the ram and an open position during the up-stroke of the ram, said ram valve being connected to said first relay valve to operate the same, a second relay valve having a first inlet connected to said mechanical regulating valve and a second inlet connected to said source of air under pressure through said mechanically operated safety stop valve, and an outlet connected to the first inlet of said non-repeat valve, and means for supplying regulated air alternatively to said ram valve or to said second relay valve, whereby, when said means is arranged to supply air to said ram valve, said ram valve opens at the end of the down-stroke of the ram, thus operating said first relay valve to supply air under pressure to said air controlled regulating valve regardless of the position of said mechanical regulating valve, to cause said clutch to remain engaged during the entire up-stroke of said ram, said ram being then stopped by disengagement of said clutch when said ram valve moves to closed position at the end of the up-stroke of said ram, causing said relay valve to shift and exhaust the air from said air controlled regulating valve; and whereby, when said means is arranged to supply air to said second relay valve, said second relay valve shifts to a position permitting air from said source passing through said safety stop valve to pass through said second relay valve and through said non-repeat valve to supply control air to said air controlled regulating valve regardless of the position of said mechanical regulating valve so that said clutch remains engaged until said safety stop valve is closed.

9. An operating mechanism for operating the friction clutch controlling the movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet and a second inlet and an outlet connected to said air controlled regulating valve, and spring means normally holding it in a position connecting said first inlet with said outlet, a mechanically operated safety stop valve having spring means to keep it normally open, a first relay valve having an outlet connected to said second inlet and having an inlet connected to a source of air under pressure through said mechanically operated safety stop valve, a ram valve, means for operating said ram valve in timed relation to the movement of said ram to occupy a closed position during the down-stroke of the ram and an open position during the up-stroke of the ram, said ram valve being connected to said first relay valve to operate the same, a second relay valve having a first inlet connected to said mechanical regulating valve and a second inlet connected to said source of air under pressure through said mechanically operated safety stop valve and an outlet connected to the first inlet of said non-repeat valve, and means for supplying regulated air alternatively to said ram valve or to said second relay valve or to neither valve; whereby, with said means arranged to supply air to neither of said valves said clutch is operated in direct proportion to the operation of said mechanical regulating valve throughout the cycle of said ram; and whereby, when said means is arranged to supply air to said ram valve said ram valve opens at the end of the down-stroke of the ram, thus operating said first relay valve to supply air under pressure to said air controlled regulating valve regardless of the position of said mechanical regulating valve, to cause said clutch to remain engaged during the entire up-stroke of said ram, said ram being then stopped by disengagement of said clutch when said ram valve moves to closed position at the end of the up-stroke of said ram, causing said relay valve to shift and exhaust the air from said air controlled regulating valve; and whereby, when air is supplied to said second relay valve said second relay valve is shifted to a position permitting air from said source passing through said safety stop valve to pass through said second relay valve and through said non-repeat valve to supply control air to said air controlled regulating valve regardless of the position of said mechanical regulating valve so that said clutch remains engaged until said safety stop valve is closed.

10. An operating mechanism for operating the friction clutch controlling the movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet and a second inlet and an outlet connected to said air controlled regulating valve, and spring means normally holding it in a position connecting said first inlet with said outlet, a mechanically operated safety stop valve having spring means to keep it normally open, a first relay valve having an outlet connected to said second inlet and having an inlet connected to a source of air under pressure through said mechanically operated safety stop valve, a ram valve, means for operating said ram valve in timed relation to the movement of said ram to occupy a closed position during the down-stroke of the ram and an open position during the up-stroke of the ram, said ram valve being connected to said first relay valve to operate the same, a second relay valve having a first inlet connected to said mechanical regulating valve and a second inlet connected to said source of air under pressure through said mechanically operated safety stop valve and an outlet connected to the first inlet of said non-repeat valve, and means for supplying regulated air alternatively to said ram valve or to said second relay valve or to both valves, whereby, when regulated air is supplied to said ram valve said ram valve opens at the end of the down-stroke of the ram, thus operating said first relay valve to supply air under pressure to said air controlled regulating valve regardless of the position of said mechanical regulating valve, to cause said clutch to remain engaged during the entire up-stroke of said ram, said ram being then stopped by disengagement of said clutch when said ram valve moves to closed position at the end of the up-stroke of said ram, causing said relay valve to close and shut off the air from said air controlled regulating valve; and whereby, when regulated air is supplied to said second relay valve said second relay valve is shifted to a position permitting air from said source passing through said safety stop valve to pass through said second relay valve and through said non-repeat valve to supply control air to said air controlled regulating valve regardless of the position of said mechanical regulating valve so that said clutch remains engaged until said safety stop valve is closed; and whereby, when regulated air is supplied to both said valves the operation is as described immediately above, except that said ram valve is open during the up-stroke of the ram, shifting said first relay valve to by-pass said second relay valve in supplying air under pressure to said air controlled regulating valve until said ram valve closes at the end of the up-stroke of the ram, whereupon said first relay valve shifts under the influence of its spring to exhaust the control air from said air controlled regulating valve.

11. An operating mechanism for operating the friction clutch controlling the movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet and a second inlet and an outlet connected to said air controlled regulating valve, and spring means normally holding it in a position connecting said first inlet with said outlet, a mechanically operated safety stop valve having spring means for keeping it normally open, a first relay valve having an outlet connected to said second inlet and having an inlet connected to a source of air under pressure through said mechanically operated safety stop valve, a ram valve, means for operating said ram valve in timed relation to the movement of said ram to occupy a closed position during the down-stroke of the ram and an open position during the up-stroke of the ram, said ram valve being connected to said first relay valve to operate the same, a second relay valve having a first inlet connected to said mechanical regulating valve and a second inlet connected to said source of air under pressure through said mechanically operated safety stop valve and an outlet connected to the first inlet of said non-repeat valve, and means for supplying regulated air alternatively to said ram valve and said second relay valve, to said second relay valve only, or to neither of said ram valve or second relay valve; whereby, when said means is arranged to supply air neither to said ram valve nor to said second relay valve, said clutch is operated in direct proportion to the operation of said mechanical regulating valve throughout the cycle of said ram; and whereby, when said means is arranged to supply air only to said second relay valve, said second relay valve is shifted to a position permitting air from said source passing through said safety stop valve to pass through said second relay valve and through said non-repeat valve to supply control air to said air controlled regulating valve regardless of the position of said mechanical regulating valve so that said clutch remains engaged until said safety stop valve is closed; and whereby, when said means is arranged to supply regulated air to both valves, the operation is as described just as above, except that said ram valve is open during the up-stroke of the ram, shifting said first relay valve to by-pass said second relay valve in supplying air under pressure to said air controlled regulating valve until said ram valve closes at the end of the up-stroke of the ram, whereupon said first relay valve shifts under the influence of its spring to exhaust the control air from said air controlled regulating valve.

12. An operating mechanism for operating the friction clutch controlling the movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet and a second inlet and an outlet connected to said air controlled regulating valve, and spring means normally holding it in a position connecting said first inlet with said outlet, a first relay valve having an outlet connected to said second inlet and having an inlet connected to a source of air under pressure and having spring means to keep it normally closed, a ram valve, means for operating said ram valve in timed relation to the movement of said ram to occupy a closed position during the down-stroke of the ram and an open position during the up-stroke of the ram, said ram valve being connected to said first relay valve to operate the same, a second relay valve having a first inlet connected to said mechanical regulating valve and a second inlet connected to said source of air under pressure and an outlet connected to the first inlet of said non-repeat valve, and means for supplying regulated air alternatively to said ram valve and said second relay valve, to said ram valve only, or to neither valve; whereby, when said means is arranged to supply air neither to said ram valve nor to said second relay valve, said clutch is operated in direct proportion to the operation of said mechanical regulating valve throughout the cycle of said ram; and whereby, when said means is arranged to supply air to said ram valve only, said ram valve opens at the end of the down-stroke of the ram, thus operating said first relay valve to supply air under pressure to said air controlled regulating valve regardless of the position of said mechanical regulating valve, to cause said clutch to remain engaged during the entire up-stroke of said ram, said ram being then stopped by disengagement of said clutch when said ram valve moves to closed position at the end of the up-stroke of said ram, causing said relay valve to close and shut off the air from said air controlled regulating valve; and whereby, when said means is arranged to supply air to both valves said second relay valve is shifted to a position permitting air from said source to pass through said second relay valve and through said non-repeat valve to supply control air to said air controlled regulating valve regardless of the posititon of said mechanical regulating valve, said ram valve opening during the up-stroke of the ram, shifting said first relay valve to by-pass said second relay valve in supplying air under pressure to said air controlled regulating valve until said ram valve closes at the end of the up-stroke of the ram, whereupon said first relay valve shifts under the influence of its spring to exhaust the control air from said air controlled regulating valve.

13. An operating mechanism for operating the friction clutch controlling the movement of the ram of a press brake and the like, comprising an air cylinder having a piston for operating said clutch, an air controlled regulating valve connected to a source of air under pressure and connected also to said cylinder to supply regulated air thereto for actuating said piston, a mechanical regulating valve connected to a source of air under pressure and connected also to said air controlled regulating valve to provide control air for said air controlled regulating valve, a non-repeat valve in said last named connection having a first inlet and a second inlet and an outlet connected to said air controlled regulating valve, and spring means normally holding it in a position connecting said first inlet with said outlet, a mechanically operated safety stop valve having spring means to keep it normally open, a first relay valve having an outlet connected to said second inlet and having an inlet connected to a source of air under pressure through said mechanically operated safety stop valve, a ram valve, means for operating said ram valve in timed relation to the movement of said ram to occupy a closed position during the down-stroke of the ram and an open position during the up-stroke of the ram, a first selector valve, said ram valve being connected through said first selector valve to said regulated air, and being also connected to said first relay valve to operate the same when said first selector valve is open, a second selector valve, a second relay valve connected to said regulated air through said second selector valve, said second relay valve having a first inlet connected to said mechanical regulating valve and a second inlet connected to said source of air under pressure through said mechanically operated safety stop valve, and an outlet connected to the first inlet of said non-repeat valve; whereby (condition 1), when both selector valves are closed said clutch is operated in direct proportion to the operation of said mechanical regulating valve throughout the cycle of said ram; and whereby (condition 2), with said first selector valve open and said second selector valve closed, said ram valve opens at the end of the downstroke of the ram, thus operating said first relay valve to supply air under pressure to said air controlled regulating valve regardless of the position of said mechanical regulating valve, to cause said clutch to remain engaged during the entire up-stroke of said ram, said ram being then stopped by disengagement of said clutch when said ram valve moves to closed position at the end of the up-stroke of said ram, causing said relay valve to close and shut off the air from said air controlled regulating valve; and whereby (condition 3), with said first selector valve closed and said second selector valve open, regulated air is supplied to said second relay valve to shift it to a position permitting air from said source passing through said safety stop valve to pass through said second relay valve and through the non-repeat valve to supply control air to said air controlled regulating valve regardless of the position of said mechanical regulating valve so that said clutch remains engaged until said safety stop valve is closed; and whereby (condition 4), with both said selector valves in the open position the operation is as in condition 3, above, except that said ram valve is open during the up-stroke of the ram, shifting said first relay valve to by-pass said second relay valve in supplying air under pressure to said air controlled regulating valve until said ram valve closes at the end of the up-stroke of the ram, whereupon said first relay valve shifts under the influence of its spring to exhaust the control air from said air controlled regulating valve.

References Cited in the file of this patent

UNITED STATES PATENTS

| | | |
|---|---|---|
| 2,039,128 | Tiedemann | Apr. 28, 1936 |
| 2,144,074 | Maybach | Jan. 17, 1939 |
| 2,171,570 | Johnson | Sept. 5, 1939 |
| 2,193,880 | Peet | Mar. 19, 1940 |
| 2,210,227 | Williamson | Aug. 6, 1940 |
| 2,214,201 | Moulder | Sept. 10, 1940 |
| 2,275,758 | Harris | Mar. 10, 1942 |
| 2,313,869 | Gayring | Mar. 16, 1943 |
| 2,323,457 | Davis | July 6, 1943 |
| 2,344,763 | Yanchenko | Mar. 21, 1944 |
| 2,423,482 | Chochol | July 8, 1947 |
| 2,675,897 | Wilson | Apr. 20, 1954 |